(12) United States Patent
Lai (10) Patent No.: US 10,030,681 B2
(45) Date of Patent: Jul. 24, 2018

(54) TELESCOPIC TUBE ASSEMBLY

(71) Applicant: Hsin-Yuan Lai, Taichung (TW)

(72) Inventor: Hsin-Yuan Lai, Taichung (TW)

( * ) Notice: Subject to any disclaimer, the term of this patent is extended or adjusted under 35 U.S.C. 154(b) by 374 days.

(21) Appl. No.: 15/058,207

(22) Filed: Mar. 2, 2016

(65) Prior Publication Data
US 2017/0002850 A1 Jan. 5, 2017

(30) Foreign Application Priority Data

Jul. 1, 2015 (TW) .............................. 104210611 U
Aug. 7, 2015 (CN) ...................... 2015 2 0589052 U (51) Int. Cl.
*F16B 7/10* (2006.01)

(52) U.S. Cl.
CPC ................................... *F16B 7/105* (2013.01)

(58) Field of Classification Search
CPC .......... F16B 2/16; F16B 7/105; F16B 7/1409; Y10T 403/32475; Y10T 403/32524; Y10T 403/32483; Y10T 403/32501; Y10T 403/7077
See application file for complete search history.

(56) References Cited

U.S. PATENT DOCUMENTS

| 3,351,363 | A | * | 11/1967 | Downey | ................. | A47L 9/244 |
| | | | | | | 285/303 |
| 5,593,239 | A | * | 1/1997 | Sallee | ................... | F16B 7/1409 |
| | | | | | | 135/114 |
| 8,147,358 | B2 | * | 4/2012 | Chen | ....................... | F16B 7/105 |
| | | | | | | 473/492 |
| 8,894,025 | B2 | * | 11/2014 | Wehage | ..................... | B62J 1/06 |
| | | | | | | 248/157 |

FOREIGN PATENT DOCUMENTS

WO WO 2008/035845 * 3/2008 ............ A47G 25/02

\* cited by examiner

*Primary Examiner* — Michael P Ferguson
(74) *Attorney, Agent, or Firm* — The Webb Law Firm (57) ABSTRACT

A telescopic tube assembly includes a telescopic tube subassembly having first and second tubes, a tubular member configured to move with the second tube, an outer sleeve sleeved on the first tube, a retaining member, an actuating member, and a biasing member. When the second tube is in an extended position, the second tube extends out of the first tube, and the retaining member is engaged in a cavity of the tubular member so as to guard against axial movement of the second tube. When the second tube is in a retracted position, the second tube is received in the first tube, and the retaining member is retracted to be disengaged from the cavity so as to permit the axial movement of the second tube.

8 Claims, 7 Drawing Sheets

TELESCOPIC TUBE ASSEMBLY

CROSS-REFERENCE TO RELATED APPLICATIONS

This application claims priority to Taiwanese Patent Application No. 104210611 filed Jul. 1, 2015, and Chinese Patent Application No. 201520589052.7 filed Aug. 7, 2015, the disclosures of which are hereby incorporated in their entirety by reference.

FIELD

The disclosure relates to a telescopic tube assembly.

BACKGROUND

A conventional telescopic tube includes large-diameter and small-diameter tube segments, and is convertible to an extended position from a retracted position by virtue of a spring-biased means. The spring-biased means includes a hairpin spring mounted in the small-diameter tube segment and a button urged by the hairpin spring to extend outwardly of a through hole in the small-diameter tube segment. In the extended position, a retaining hole in the large-diameter tube segment is in register with the through hole to permit the button to extend outwardly of the retaining hole. The button can be pressed to permit the telescopic tube to be converted to the retracted position. In the retracted position, the smaller-diameter tube segment is retained in the large-diameter tube segment at a position by virtue of frictional engagement between the button and an inner surface of the large-diameter tube segment.

However, in the retracted position, the large-diameter and small-diameter tube segments can rotate relative to each other. As such, when the telescopic tube is converted from the retracted position to the extended position, manual alignment of the through hole and the retaining hole may be necessary. Furthermore, for converting the telescopic tube from the extended position to the retracted position, it is necessary to hold the large-diameter tube segment and press the button with one hand, and push the small-diameter tube segment inwardly with the other hand. In this case, the user's finger that presses the button might be injured by the small-diameter tube segment being pushed into the large-diameter tube segment

SUMMARY

Therefore, an object of the disclosure is to provide a novel telescopic tube assembly which can be operated safely and conveniently.

According to the disclosure, a telescopic tube assembly includes a telescopic tube subassembly, a tubular member, an outer sleeve, a retaining member, an actuating member, and a biasing member. The telescopic tube subassembly includes first and second tubes respectively having couple ends telescopically fitted to each other along a longitudinal axis. The first tube has a first inner peripheral surface which defines a first axial bore. The second tube has a second inner peripheral surface which defines a second axial bore. The second tube is axially movable between an extended position, where the second tube extends out of the first axial bore, and a retracted position, where the second tube is received in the first axial bore. The tubular member extends along the longitudinal axis, and has inner and outer tubular surfaces opposite to each other in radial directions. The outer tubular surface has an outer large-dimension region and an outer small-dimension region, which define therebetween an outer shoulder. The outer large-dimension region is configured to be slidably engaged with the first inner peripheral surface so as to permit the tubular member to be slidable relative to the first inner peripheral surface along the longitudinal axis. The outer small-dimension region is configured to be in frictional engagement with the second inner peripheral surface so as to permit the second tube to be abuttable against the outer shoulder and to permit the tubular member to move with the second tube. The inner tubular surface has an inner large-dimension region and an inner small-dimension region, which define therebetween an inner shoulder. The outer large-dimension region has a transition zone disposed between the outer and inner shoulders. The tubular member further has a cavity formed in the transition zone. The outer sleeve has an upper segment which is configured to be sleeved on and in frictional engagement with the couple end of the first tube, and a lower segment which is configured to be slidably engaged with the second tube so as to permit the second tube to move relative to the outer sleeve. The lower segment has a passage which extends radially through the lower segment. The retaining member has retaining and cam ends opposite to each other radially, and is disposed in the passage. The retaining member is movable radially between an inward position, where the second tube is in the extended position and the retaining end is fully engaged in the cavity so as to guard against axial movement of the second tube, and an outward position, where the retaining end is retracted in the passage to be disengaged from the cavity so as to permit the axial movement of the second tube. The actuating member is disposed to be axially movable relative to the upper segment so as to be displaceable among a locked position, where the retaining member is in the inward position, an unlocked position, where the retaining member is in the outward position, and a ready position, where the retaining member is permitted to be moved away from the inward position by an initiation of the axial movement of the second tube. The actuating member has a cam surface configured such that when the actuating member is displaced toward the locked position from the unlocked position, the retaining member is pressed radially and inwardly due to the cam action between the cam surface and the cam end, so as to permit displacement of the retaining member to the inward position. The biasing member is disposed to bias the actuating member to move toward the locked position.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
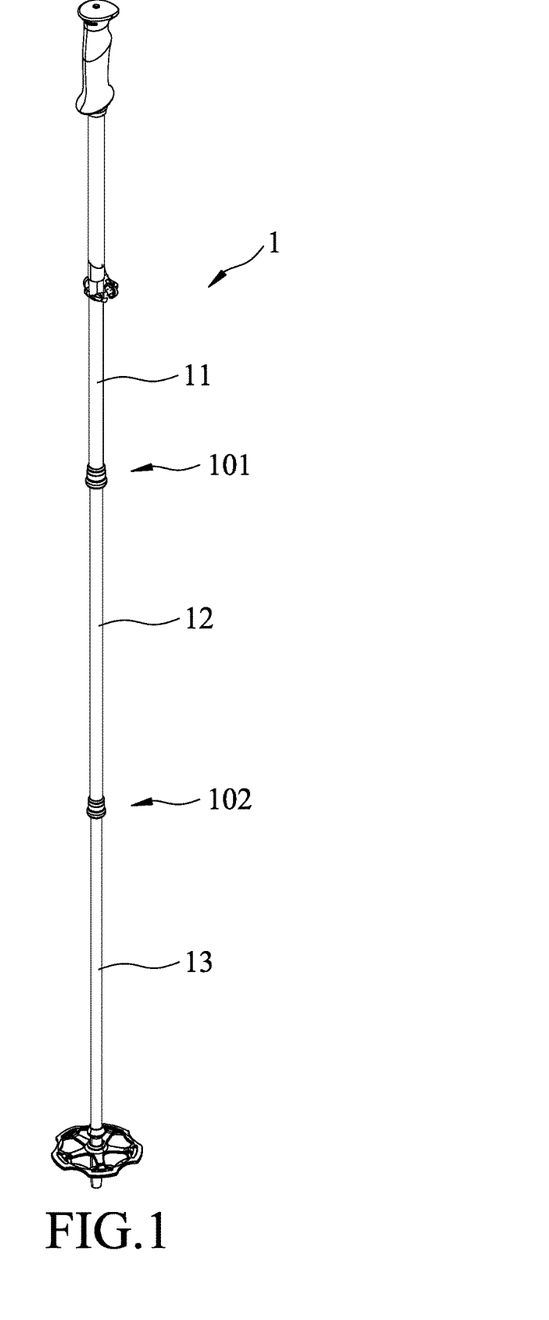
FIG. 1 is a perspective view of a telescopic tube assembly according to the disclosure.

As shown in FIG. 1, a telescopic tube assembly according to an embodiment of the disclosure includes a telescopic tube subassembly 1, and first and second locking devices 101, 102. The first and second locking devices 101, 102 are substantially the same.

The telescopic tube subassembly 1 includes first, second, and third tubes 11, 12, 13. The first and second tubes 11, 12 can be locked to each other by the first locking device 101. The second and third tubes 12, 13 can be locked to each other by the second locking device 102. Since the connection relationship among the first and second tubes 11, 12 and the first locking device 101 is similar to the connection relationship among the second and third tubes 12, 13 and the second locking device 102, only the connection relationship among the first and second tubes 11, 12 and the first locking device 101 is described below.

Figure 2:
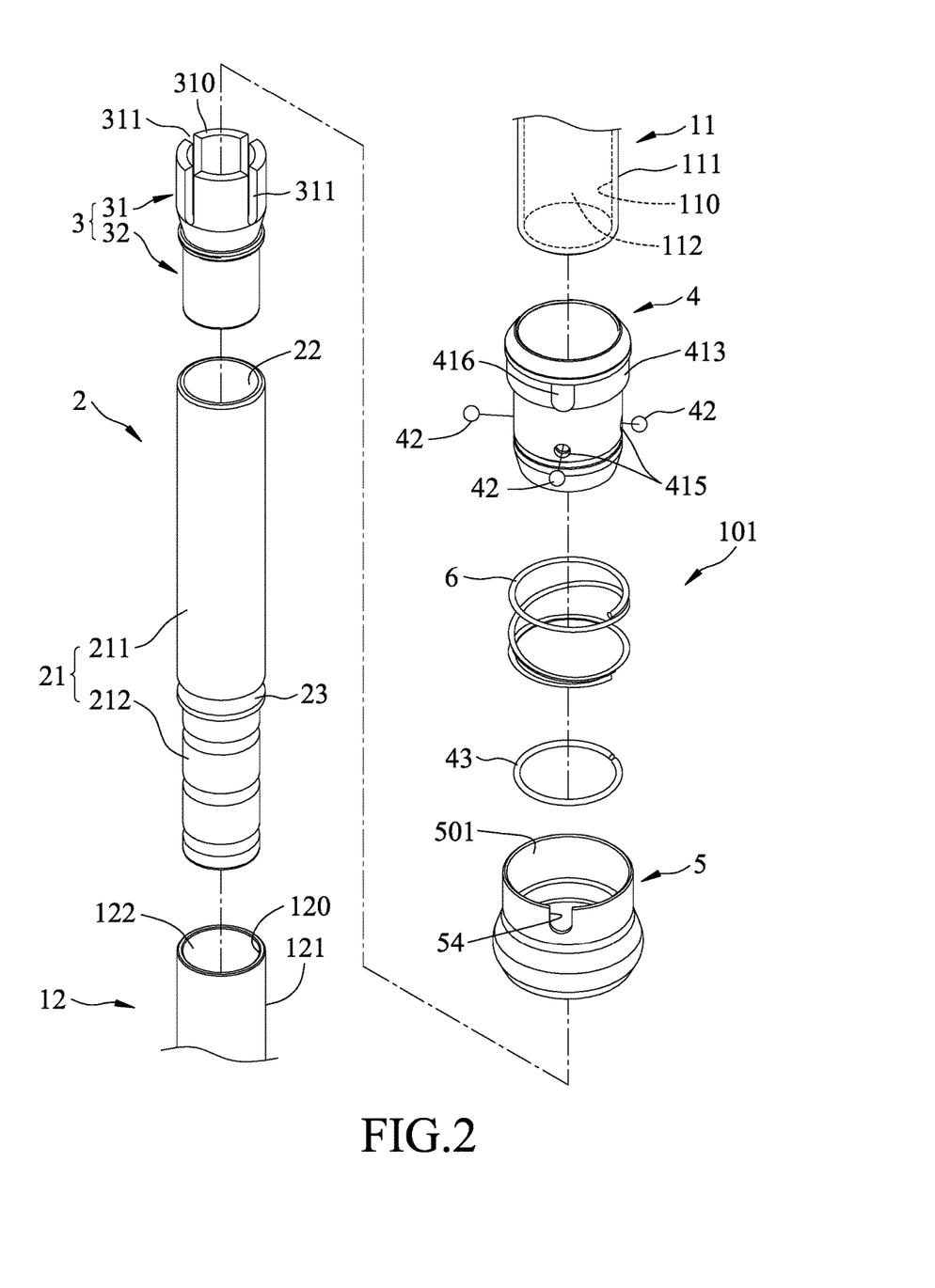
FIG. 2 is an exploded, fragmentary perspective view of the telescopic tube assembly.
Figure 3:
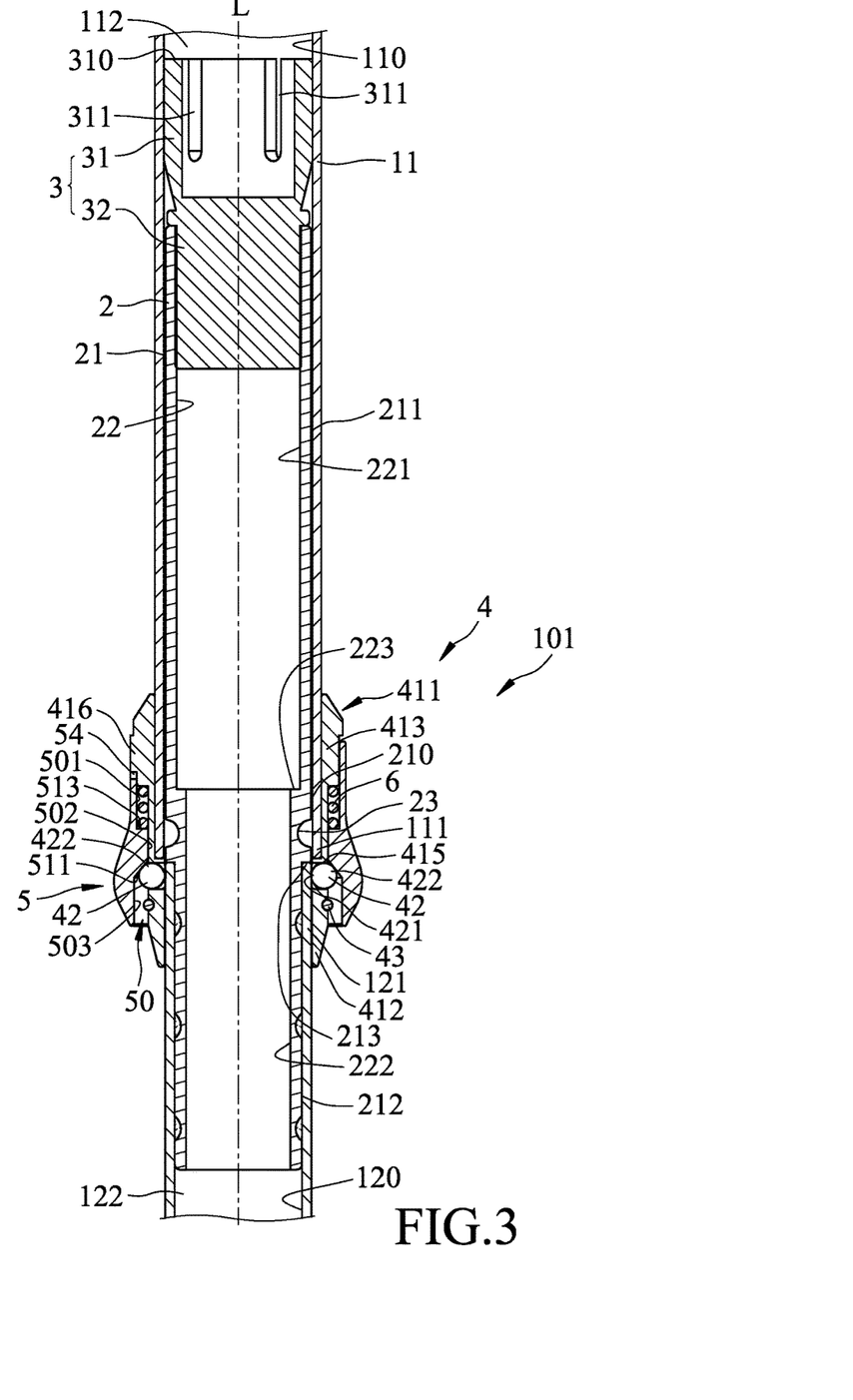
FIG. 3 is a fragmentary cross-sectional view of the telescopic tube assembly.
Figure 4:
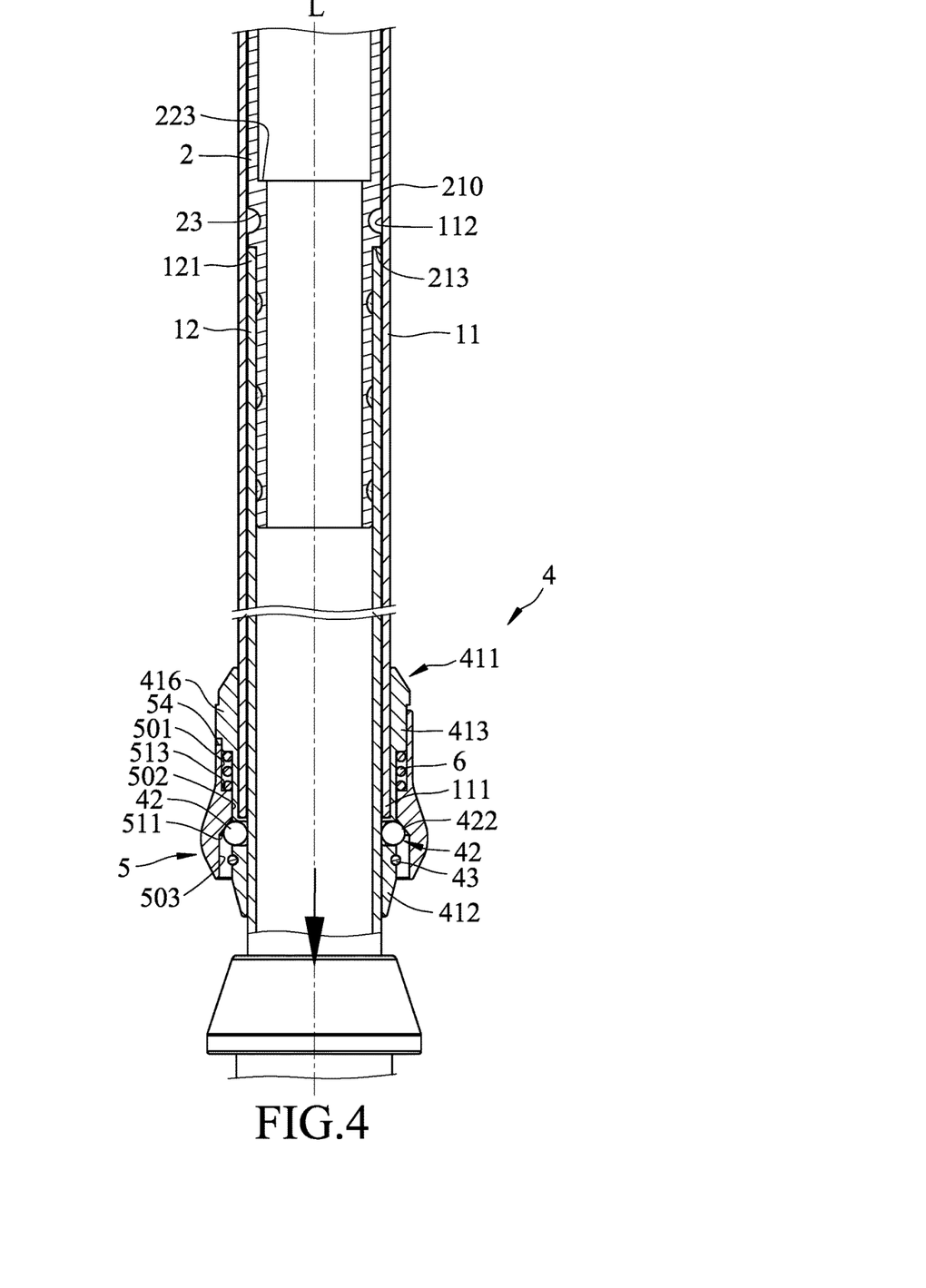
FIG. 4 is similar to FIG. 3 but illustrating a second tube in a retracted position.

With reference to FIGS. 2 and 3, the first and second tubes 11, 12 respectively have couple ends 111, 121 telescopically fitted to each other along a longitudinal axis (L). The first tube 11 has a first inner peripheral surface 110 which defines a first axial bore 112. The second tube 12 has a second inner peripheral surface 120 which defines a second axial bore 122. The second tube 12 is axially movable between an extended position (FIG. 5), where the second tube 12 extends out of the first axial bore 112, and a retracted position (FIG. 4), where the second tube 12 is received in the first axial bore 112. In this embodiment, the second tube 12 has an outer diameter substantially the same as an inner diameter of the first tube 11.

The first locking device 101 includes a tubular member 2, an outer sleeve 4, a retaining member 42, an actuating member 5, and a biasing member 6.

As shown in FIGS. 2 and 3, the tubular member 2 extends along the longitudinal axis (L), and has inner and outer tubular surfaces 21, 22 opposite to each other in radial directions. The outer tubular surface 21 has an outer large-dimension region 211 and an outer small-dimension region 212, which define therebetween an outer shoulder 213. The outer large-dimension region 211 is configured to be slidably engaged with the first inner peripheral surface 110 so as to permit the tubular member 2 to be slidable relative to the first inner peripheral surface 110 along the longitudinal axis (L). The outer small-dimension region 212 is configured to be in frictional engagement with the second inner peripheral surface 120 so as to permit the second tube 12 to be abuttable against the outer shoulder 213 and to permit the tubular member 2 to move with the second tube 12. The inner tubular surface 22 has an inner large-dimension region 221 and an inner small-dimension region 222, which define therebetween an inner shoulder 223. The outer large-dimension region 211 has a transition zone 210 disposed between the outer and inner shoulders 213, 223. The tubular member 2 further has a cavity 23 formed in the transition zone 210.

The outer sleeve 4 has upper and lower segments 411, 412. The upper segment 411 is configured to be sleeved on and in frictional engagement with the couple end 111 of the first tube 11. The lower segment 412 is configured to be slidably engaged with the second tube 12 so as to permit the second tube 12 to move relative to the outer sleeve 4. The lower segment 412 has a passage 415 which extends radially therethrough. In this embodiment, the upper segment 411 has an upper flange 413 extending radially and outwardly.

The retaining member 42 has retaining and cam ends 421, 422 opposite to each other radially, and is disposed in the passage 415. The retaining member 42 is movable radially between an inward position (FIGS. 5 and 6), where the second tube 12 is in the extended position and the retaining end 421 is fully engaged in the cavity 23 so as to guard against axial movement of the second tube 12, and an outward position (FIGS. 3 and 4), where the retaining end 421 is retracted in the passage 415 to be disengaged from the cavity 23 so as to permit the axial movement of the second tube 12. In this embodiment, the retaining member 42 is a rolling ball. The cavity 23 may have an arc-shaped cross-section with an arc angle larger than 135° but not larger than 180°. In this embodiment, the arc angle is 180°.

Figure 5:
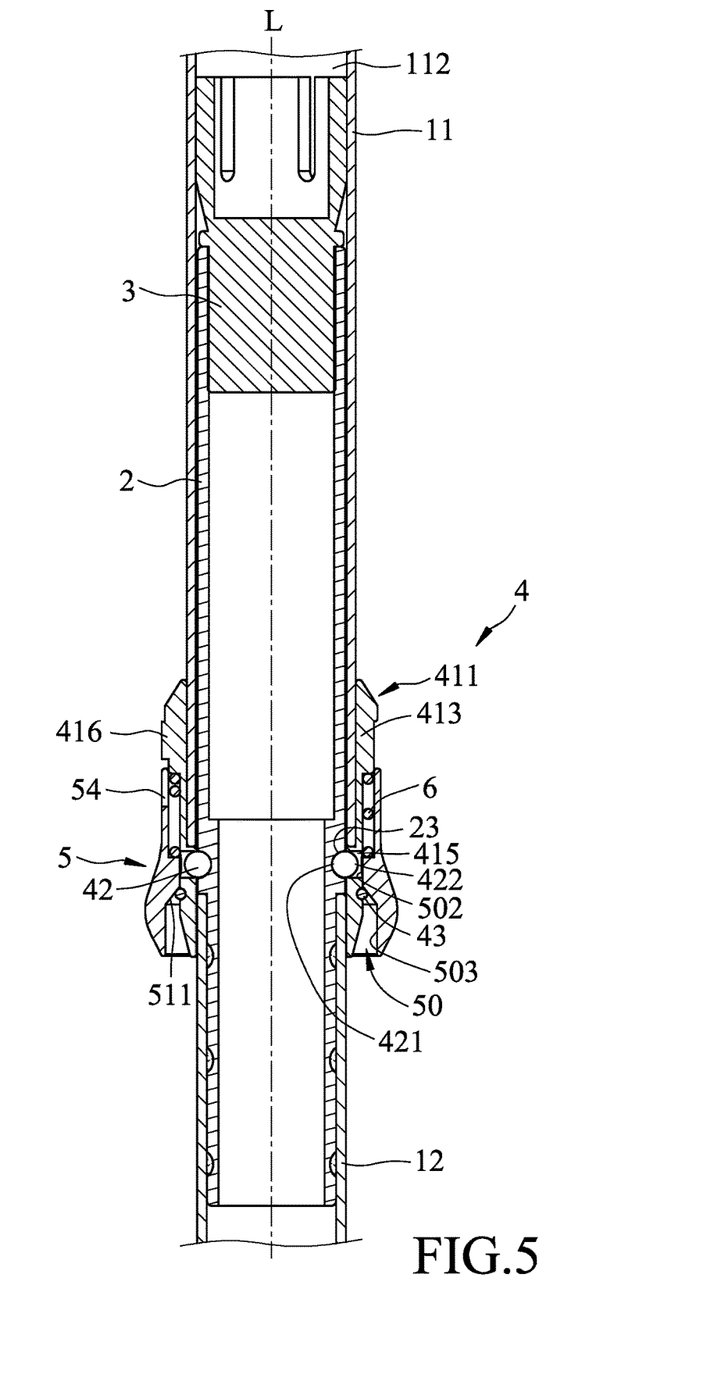
FIG. 5 is similar to FIG. 3 but illustrating the second tube in an extended position and an actuating member in a locked position.
Figure 6:
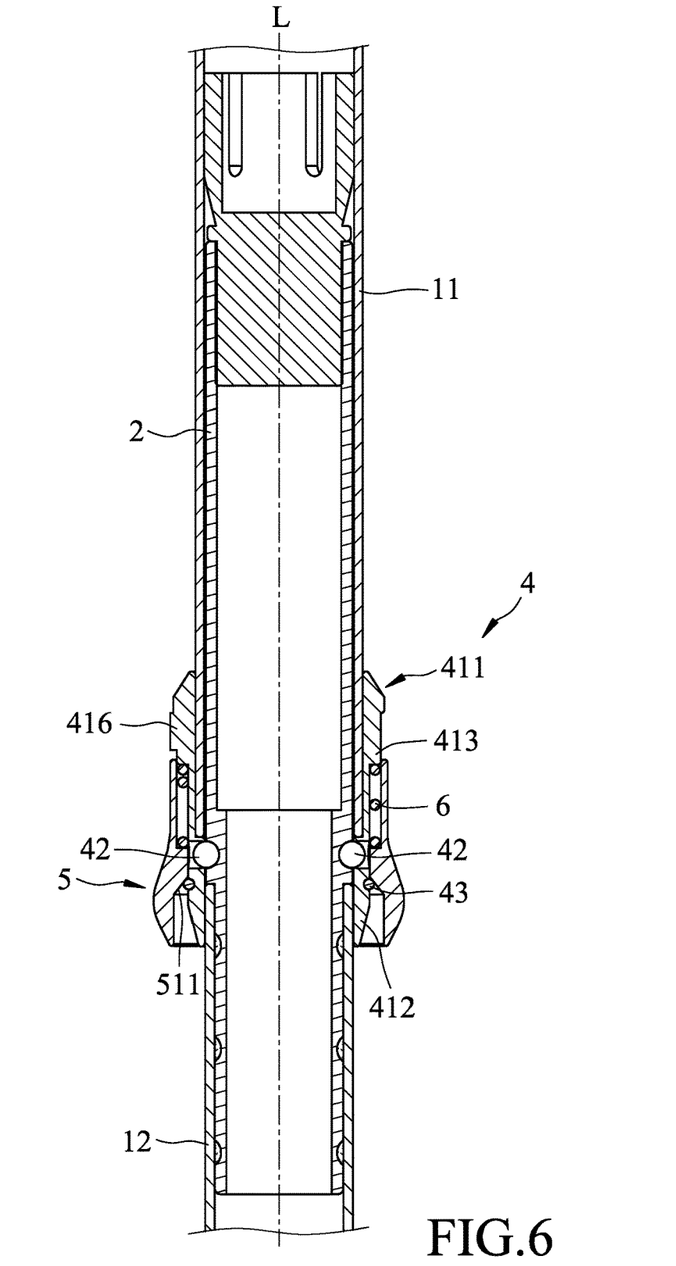
FIG. 6 is similar to FIG. 5 but illustrating that a slot of the actuating member is brought out of register with a peg of an outer sleeve.
Figure 7:
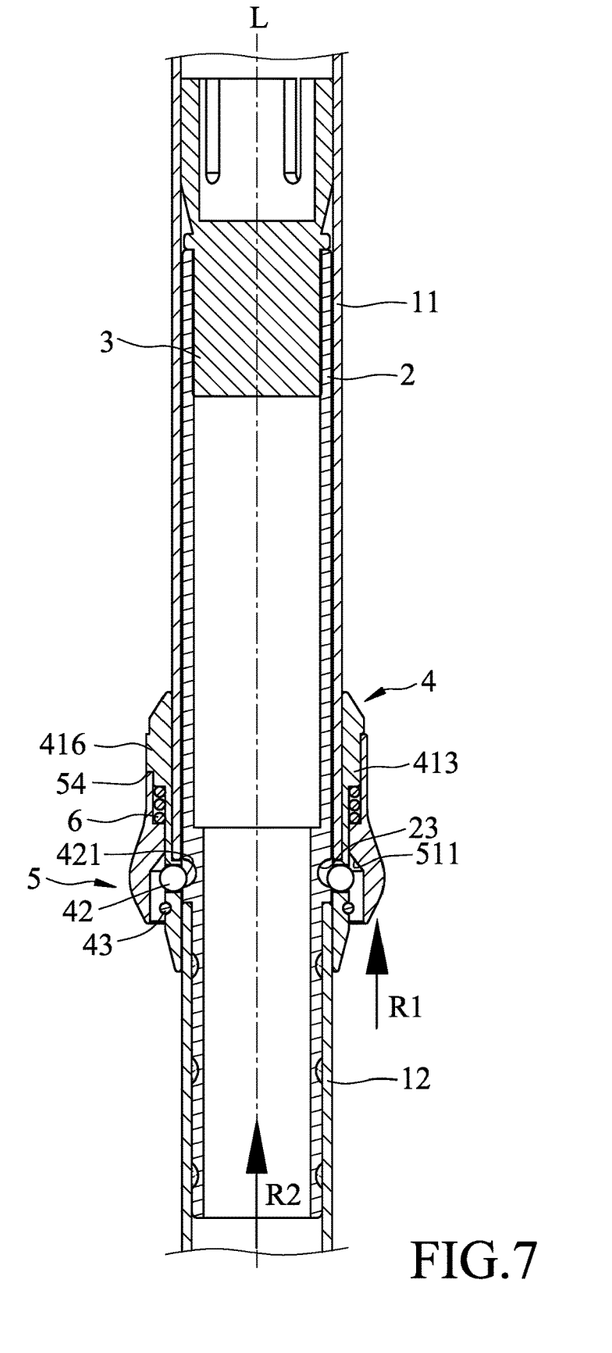
FIG. 7 is similar to FIG. 5 but illustrating the actuating member in a ready position.

The actuating member 5 is disposed to be axially movable relative to the upper segment 411 so as to be displaceable among a locked position (FIGS. 5 and 6), where the retaining member 42 is in the inward position, an unlocked position, where the retaining member 42 is in the outward position (FIGS. 3 and 4), and a ready position (FIG. 7), where the retaining member 42 is permitted to be moved away from the inward position by an initiation of the axial movement of the second tube 12. The actuating member 5 has a cam surface 511. When the second tube 12 is pulled along the arrow shown in FIG. 4 to displace the actuating member 5 toward the locked position (FIGS. 5 and 6) from the unlocked position (FIGS. 3 and 4), the retaining member 42 is pressed radially and inwardly due to the cam action between the cam surface 511 and the cam end 422, so as to permit displacement of the retaining member 42 to the inward position (FIGS. 5 and 6).

The biasing member 6 is disposed to bias the actuating member 5 to move toward the locked position.

As shown in FIG. 3, the actuating member 5 has an inner peripheral surface 50 which is configured to surround the outer sleeve 4, and which includes an upper surface region 501, a middle surface region 502, and a lower surface region 503. The lower surface region 503 has a dimension larger than that of the middle surface region 502, and the middle surface region 502 and the lower surface region 503 define therebetween the cam surface 511. The middle surface region 502 is configured to confront the retaining member 42 in the inward position (FIGS. 5 and 6).

In addition, the upper surface region 501 has a dimension larger than that of the middle surface region 502, and the upper surface region 501 and the middle surface region 502 define therebetween an upward shoulder 513. The biasing member 6 is a spring sleeved on the outer sleeve 41 and is disposed between the upper flange 413 and the upward shoulder 513.

As shown in FIGS. 2 and 3, the cavity 23 extends in a circumferential direction surrounding the longitudinal axis (L), the outer sleeve 4 has four of the passages 415 (only two are shown in FIG. 2), and the first locking device includes four of the retaining members 42 (only three are shown in FIG. 2) disposed respectively in the passages 415. Even if the second tube 12 rotates about the longitudinal axis (L) in operation, the retaining members 42 can all be engaged in the cavity 23 when the second tube 12 is displaced to the extended position (FIGS. 5 and 6), since the cavity 23 is in an annular form.

In this embodiment, the first locking device 101 further includes a limit ring 43 which is fixed around the lower segment 412 of the outer sleeve 4, and which is configured to engage the cam surface 511 when the actuating member 5 is displaced to the locked position (FIGS. 5 and 6).

Furthermore, the actuating member 5 is turnable about the longitudinal axis (L) and has a slot 54, as shown in FIGS. 2 and 3. The upper segment 41 includes a peg 416 configured such that when the slot 54 is brought into register with the peg 416 (FIGS. 5 and 7), the actuating member 5 is permitted to be displaced to the ready position (FIG. 7), and such that when the slot 54 is brought out of register with the peg 416 (FIG. 6), the actuating member 5 is prevented from being displaced to the ready position. As shown in FIGS. 2 and 3, the peg 416 extends along a direction of the longitudinal axis (L), and the slot 54 also extends along the direction of the longitudinal axis (L).

In operation, after the second tube 12 is displaced to the extended position, a user can rotate the actuating member 5 such that the slot 54 is out of register with the peg 416. Thus, the actuating member 5 will not be undesirably displaced to the ready position, and the second tube 12 can be retained in the extended position. To displace the second tube 12 to the retracted position, a user can rotate the actuating member 5 such that the slot 54 is in register with the peg 416. Thereafter, the actuating member 5 can be displaced to the ready position (see arrow R1 in FIG. 7), and the retaining members 42 can be displaced to the outward position by the axial movement of the second tube 12 (see arrow R2 in FIG. 7).

If the second tube 12 is displaced toward the extended position at a relatively fast speed, the retaining members 42 may not be moved to the inward position. Thus, the first locking device 101 may further include a plug member 3 which extends along the longitudinal axis (L), and which has upward and downward segments 31, 32 opposite to each other. The downward segment 32 is configured to be in frictional engagement with the inner tubular surface 22 of the tubular member 2 so as to permit the plug member 3 to move with the second tube 12. The upward segment 31 is configured to be in traction engagement with the first inner peripheral surface 110 so as to impede the axial movement of the second tube 12. In this embodiment, the upward segment 31 has a plurality of slits 311 extending downwardly from an upper end 310 of the upward segment 31 toward the downward segment 32 so as to enhance the flexibility of the plug member 3.

Moreover, because the cavity 23 of the tubular member 2 and the retaining members 42 are not exposed outwardly, the user will not get hurt during displacement of the second tube 12.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A telescopic tube assembly, comprising:
    a telescopic tube subassembly including first and second tubes respectively having coupling ends telescopically fitted to each other along a longitudinal axis, said first tube having a first inner peripheral surface which defines a first axial bore, said second tube having a second inner peripheral surface which defines a second axial bore, said second tube being axially movable between an extended position, where said second tube extends out of said first axial bore, and a retracted position, where said second tube is received in said first axial bore;
    a tubular member extending along the longitudinal axis, and having inner and outer tubular surfaces opposite to each other in radial directions, said outer tubular surface having an outer large-dimension region and an outer small-dimension region, which define therebetween an outer shoulder, said outer large-dimension region being configured to be slidably engaged with said first inner peripheral surface so as to permit said tubular member to be slidable relative to said first inner peripheral surface along the longitudinal axis, said outer small-dimension region being configured to be in frictional engagement with said second inner peripheral surface so as to permit said second tube to be abuttable against said outer shoulder and to permit said tubular member to move with said second tube, said inner tubular surface having an inner large-dimension region and an inner small-dimension region, which define therebetween an inner shoulder, said outer large-dimension region having a transition zone disposed between said outer and inner shoulders, said tubular member further having a cavity formed in said transition zone;
    an outer sleeve having an upper segment which is configured to be sleeved on and in frictional engagement with said coupling end of said first tube, and a lower segment which is configured to be slidably engaged with said second tube so as to permit said second tube to move relative to said outer sleeve, said lower segment having a passage which extends radially through said lower segment;
    a retaining member having retaining and cam ends opposite to each other radially, and disposed in said passage, said retaining member being movable radially between an inward position, where said second tube is in the extended position and said retaining end is fully engaged in said cavity so as to guard against axial movement of said second tube, and an outward position, where said retaining end is retracted in said passage to be disengaged from said cavity so as to permit the axial movement of said second tube;
    an actuating member disposed to be axially movable relative to said upper segment so as to be displaceable among a locked position, where said retaining member is in the inward position, an unlocked position, where said retaining member is in the outward position, and a ready position, where said retaining member is permitted to be moved away from the inward position by an initiation of the axial movement of said second tube, said actuating member having a cam surface configured such that when said actuating member is displaced toward the locked position from the unlocked position, said retaining member is pressed radially and inwardly due to the cam action between said cam surface and said cam end, so as to permit displacement of said retaining member to the inward position; and
    a biasing member sleeved on said outer sleeve and disposed between said upper segment and said actuating member to bias said actuating member to move toward the locked position.

2. The telescopic tube assembly according to claim 1, wherein said cavity extends in a circumferential direction surrounding the longitudinal axis.

3. The telescopic tube assembly according to claim 1, wherein said actuating member has an inner peripheral surface including an upper surface region, a middle surface region, and a lower surface region which has a dimension larger than that of said middle surface region, said middle surface region and said lower surface region defining therebetween said cam surface, said middle surface region being configured to confront said retaining member in the inward position.

4. The telescopic tube assembly according to claim 3, further comprising a limit ring which is fixed around said lower segment of said outer sleeve, and which is configured to engage said cam surface when said actuating member is displaced to the locked position.

5. The telescopic tube assembly according to claim 4, wherein said inner peripheral surface of said actuating member is configured to surround said outer sleeve, said upper surface region having a dimension larger than that of said middle surface region, said upper surface region and said middle surface region defining therebetween an upward shoulder, said upper segment of said outer sleeve having an upper flange, said biasing member being sleeved on said outer sleeve and disposed between said upper flange and said upward shoulder.

6. The telescopic tube assembly according to claim 5, wherein said actuating member is turnable about the longitudinal axis and has a slot, said upper segment including a peg configured such that when said slot is brought into register with said peg, said actuating member is permitted to be displaced to the ready position, and such that when said slot is brought out of register with said peg, said actuating member is prevented from being displaced to the ready position.

7. The telescopic tube assembly according to claim 1, further comprising a plug member which extends along the longitudinal axis, and which has upward and downward segments opposite to each other, said downward segment being configured to be in frictional engagement with said inner tubular surface of said tubular member so as to permit said plug member to move with said second tube, said upward segment being configured to be in traction engagement with said first inner peripheral surface so as to impede the axial movement of said second tube.

8. The telescopic tube assembly according to claim 7, wherein said upward segment has a plurality of slits extending downwardly from an upper end of said upward segment toward said downward segment so as to enhance flexibility of said plug member.

\* \* \* \* \*